US009635104B2

(12) United States Patent
Long et al.

(10) Patent No.: US 9,635,104 B2
(45) Date of Patent: Apr. 25, 2017

(54) METHOD, APPARATUS, AND SYSTEM FOR GENERATING A P2P NETWORK SCHEME (71) Applicant: TENCENT TECHNOLOGY (SHENZHEN) COMPANY LIMITED, Shenzhen (CN)

(72) Inventors: Qiang Long, Shenzhen (CN); Zufeng Ji, Shenzhen (CN); Naixiang Ao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 452 days.

(21) Appl. No.: 14/141,591

(22) Filed: Dec. 27, 2013

(65) Prior Publication Data
US 2014/0108669 A1 Apr. 17, 2014

Related U.S. Application Data (63) Continuation of application No. PCT/CN2013/070553, filed on Jan. 16, 2013.

(30) Foreign Application Priority Data

Mar. 9, 2012 (CN) .......................... 2012 1 0061026

(51) Int. Cl.
G06F 15/16 (2006.01)
H04L 29/08 (2006.01)
(52) U.S. Cl.
CPC ................... H04L 67/104 (2013.01)
(58) Field of Classification Search
USPC ................. 709/227–230, 217, 232
See application file for complete search history.

(56) References Cited

U.S. PATENT DOCUMENTS 6,208,640 B1 * 3/2001 Spell ....................... H04L 47/10
370/358
7,333,515 B1 * 2/2008 Ramakrishnan . H04N 21/23608
370/487

(Continued)

FOREIGN PATENT DOCUMENTS

| CN | 101123606 A | 2/2008 |
|---|---|---|
| CN | 101350764 A | 1/2009 |
| CN | 101350765 A | 1/2009 |

OTHER PUBLICATIONS

De Cicco, Luca, Saverio Mascolo, and Vittorio Palmisano. "Skype video responsiveness to bandwidth variations." In Proceedings of the 18th International Workshop on Network and Operating Systems Support for Digital Audio and Video, pp. 81-86. ACM, 2008.*

(Continued)

Primary Examiner — Karen Tang
Assistant Examiner — Melaku Habtemariam
(74) Attorney, Agent, or Firm — Anova Law Group, PLLC (57) ABSTRACT Various embodiments provide methods, apparatus, and systems for generating P2P network schemes. In an exemplary method for generating a P2P network scheme, predicted data can be obtained and used to determine a bandwidth managing scheme of the predicted data, based on a corresponding relationship between predicted data and bandwidth managing schemes. The bandwidth managing scheme can be executed and be used to automatically determine schemes, e.g., for pushing resources into the P2P network.

14 Claims, 4 Drawing Sheets (56) References Cited

U.S. PATENT DOCUMENTS

| | | | | |
|---|---|---|---|---|
| 2008/0117813 A1* | 5/2008 | Hwang | ............... | H04L 12/5695 |
| | | | | 370/230 |
| 2008/0155120 A1* | 6/2008 | Argawal | ............... | H04L 67/104 |
| | | | | 709/242 |
| 2008/0240156 A1* | 10/2008 | Elliot | ..................... | H04L 47/10 |
| | | | | 370/468 |
| 2009/0003229 A1* | 1/2009 | Loh | .................... | H04L 41/0833 |
| | | | | 370/252 |
| 2009/0319681 A1* | 12/2009 | Freelander | .......... | H04L 67/1008 |
| | | | | 709/233 |
| 2010/0067432 A1* | 3/2010 | Baptista | ............. | H04B 7/18582 |
| | | | | 370/316 |
| 2010/0142376 A1* | 6/2010 | Lou | ........................ | H04L 47/10 |
| | | | | 370/236 |
| 2010/0150223 A1* | 6/2010 | Nagaraj | ................ | H04N 19/70 |
| | | | | 375/240.01 |
| 2011/0258322 A1* | 10/2011 | Luzzatti | ............... | H04L 47/765 |
| | | | | 709/226 |

OTHER PUBLICATIONS

State Intellectual Property Office of the P.R.C (SIPO) Office Action 1 for 201210061026.8 Dec. 16, 2016 8 Pages.

* cited by examiner

METHOD, APPARATUS, AND SYSTEM FOR GENERATING A P2P NETWORK SCHEME

CROSS-REFERENCES TO RELATED APPLICATIONS

This application is a continuation application of PCT Patent Application No. PCT/CN2013/070553, filed on Jan. 16, 2013, which claims priority to Chinese Patent Application No. CN201210061026.8, filed on Mar. 9, 2012, the entire contents of all of which are incorporated herein by reference.

FIELD OF THE DISCLOSURE

The present disclosure relates to the field of computer technology and, more particularly, relates to methods, apparatus, and systems for generating P2P (i.e., Peer-to-Peer or Point-to-Point) network schemes.

BACKGROUND

Downloading resources (such as a game resource) is an important part of online life of internet users. To attract more users, resource providers (and/or operators) have made a lot effort not only to provide downloading services but also to provide desired downloading speed for users to rapidly obtain resources. Typically, the providers/operators use their own server to provide users with links. Users may then use browsers to visit these links and to download the resources from the server via HTTP (Hyper Text Transport Protocol).

A P2P network is often used to provide additional downloading resources. That is, in addition to the server providing resources for downloading, users who already have the resources (e.g., who have downloaded resources from the server through HTTP) may provide their resources to other users for downloading. For example, nodes (or computers or node computers) in the P2P network may act as a client or server to allow a shared access to their resources for other computers (or users) in the same P2P network to download. The overall downloading speed is then increased and contributed by the downloading speeds provided by both the P2P network and the server.

To save bandwidth of the server, P2P pushing techniques are used by resource providers/operators to increase the downloading speed. In this case, the server may push and send resources to the P2P network prior to their releasing. For example, the server may send the resources to certain P2P nodes in the P2P network before the resources are released, such that less bandwidth will be consumed when the resources are released. As such, when a large amount of users performs downloading at the same time, there is no need to increase bandwidth of the server because P2P network can also provide resources for downloading with a desired downloading speed. Further, after the resources are released and if the server provides an undesired downloading speed, resources can be pushed into the P2P network to provide the desired downloading speed via the P2P network.

During such P2P pushing process, decisions regarding: if a pushing action is needed, when to push resources, and/or how to push resources into the P2P network are made by personal analysis. Schemes for pushing resources are also personally decided and executed, which relies on the person's skills and experiences. It is therefore desirable to provide methods, apparatus, and systems for automatically generating P2P network schemes.

BRIEF SUMMARY OF THE DISCLOSURE

Various embodiments provide methods, apparatus, and systems for automatically (as opposed to personally or manually) generating P2P network schemes (or strategies). In one embodiment, data can be automatically analyzed and schemes for pushing resources can be automatically determined by generating a bandwidth managing scheme.

According to various embodiments, there is provided a method for generating a P2P network scheme. In this method, predicted data can be obtained and used to determine a bandwidth managing scheme of the predicted data based on a corresponding relationship between predicted data and bandwidth managing schemes. The bandwidth managing scheme can then be executed.

According to various embodiments, there is provided an apparatus for generating a P2P network scheme. The apparatus can include an obtaining module, a scheme module, and an execution module. The obtaining module can be configured to obtain predicted data. The scheme module can be configured to determine a bandwidth managing scheme of the predicted data based on a corresponding relationship between predicted data and bandwidth managing schemes. The execution module can be configured to execute the bandwidth managing scheme.

In this manner, schemes for managing bandwidth in a P2P network can be automatically generated via the predicted data. The generated bandwidth managing schemes can then be used to automatically determine schemes, e.g., for pushing resources. Processes involving personal analysis and executions can be reduced or avoided.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Figure 6:
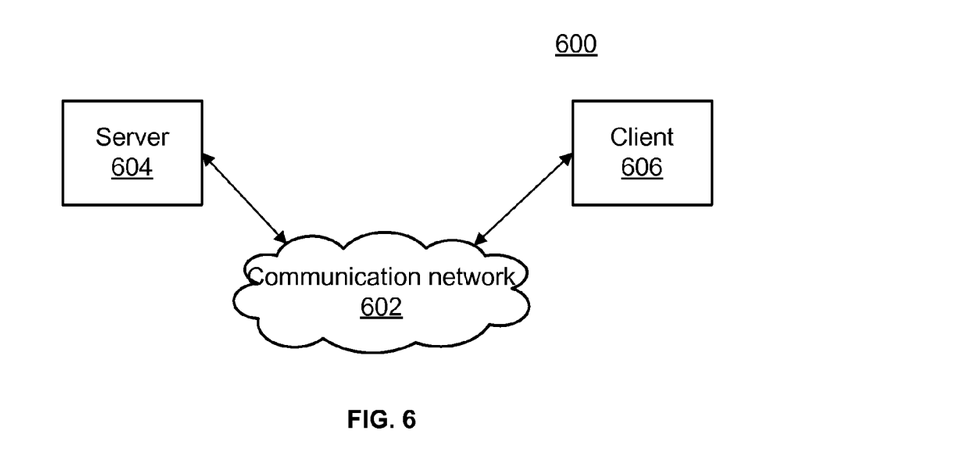
FIG. 6 depicts an exemplary environment incorporating certain disclosed embodiments.

FIG. 6 depicts an exemplary environment 600 incorporating certain disclosed embodiments. As shown in FIG. 6, environment 600 can include a server 604, a client 606, and a communication network 602. The server 604 and the client 606 may be coupled through the communication network 602 for information exchange, such as Internet searching, data downloading, etc. Although only one client 606 and one server 604 is shown in the environment 600, any number of clients 606 or servers 604 may be included, and other devices may also be included.

Communication network 602 may include any appropriate type of communication network for providing network connections to the server 604 and client 606 or among multiple servers 604 or clients 606. For example, communication network 602 may include the Internet or other types of computer networks or telecommunication networks, either wired or wireless.

A client, as used herein, may refer to any appropriate user terminal with certain computing capabilities, such as a personal computer (PC), a work station computer, a server computer, a hand-held computing device (tablet), a smart phone or mobile phone, or any other user-side computing device. In one embodiment, such user terminal can be used as, e.g., a node in a P2P (peer-to-peer) network.

Figure 7:
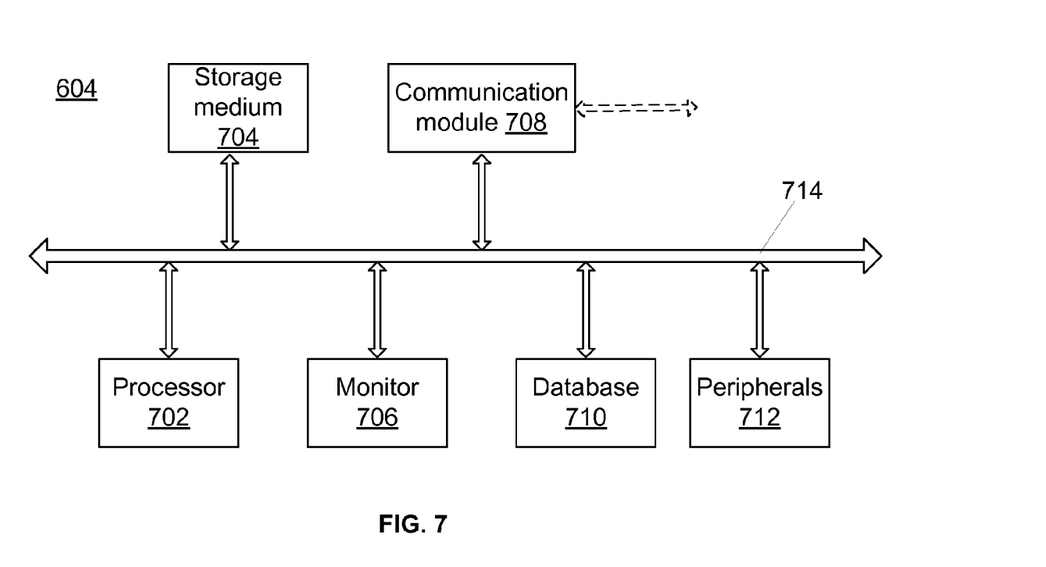
FIG. 7 depicts an exemplary server consistent with the disclosed embodiments.

A server, as used herein, may refer one or more server computers configured to provide certain server functionalities, such as database management and search engines. A server may also include one or more processors to execute computer programs in parallel. FIG. 7 shows a block diagram of an exemplary server 604.

As shown in FIG. 7, server 604 may include a processor 702, a storage medium 704, a monitor 706, a communication module 708, a database 710, peripherals 712, and one or more bus 714 to couple the devices together. Certain devices may be omitted and other devices may be included.

Processor 702 can include any appropriate processor or processors. Further, processor 702 can include multiple cores for multi-thread or parallel processing. Storage medium 704 may include memory modules, such as ROM, RAM, and flash memory modules, and mass storages, such as CD-ROM, U-disk, removable hard disk, etc. Storage medium 704 may store computer programs for implementing various processes, when executed by processor 702.

Further, peripherals 712 may include I/O devices such as keyboard and mouse, and communication module 708 may include network devices for establishing connections through the communication network 602. Database 710 may include one or more databases for storing certain data and for performing certain operations on the stored data, such as database searching.

In operation, client 606 may cause server 604 to perform certain actions, such as an Internet search or other database operations. Server 604 may be configured to provide structures and functions for such actions and operations. More particularly, server 604 may include a data searching system for real-time database searching. The real-time database searching functionality may be realized by separating a server database into a plurality of databases each having a fixed upper limit on the database capacity, i.e., maximum capacity. Thus, instead of creating indices for a single large database, which may be a large number, indices of the plurality of smaller databases can be created with substantially less amount of time.

Figure 1:
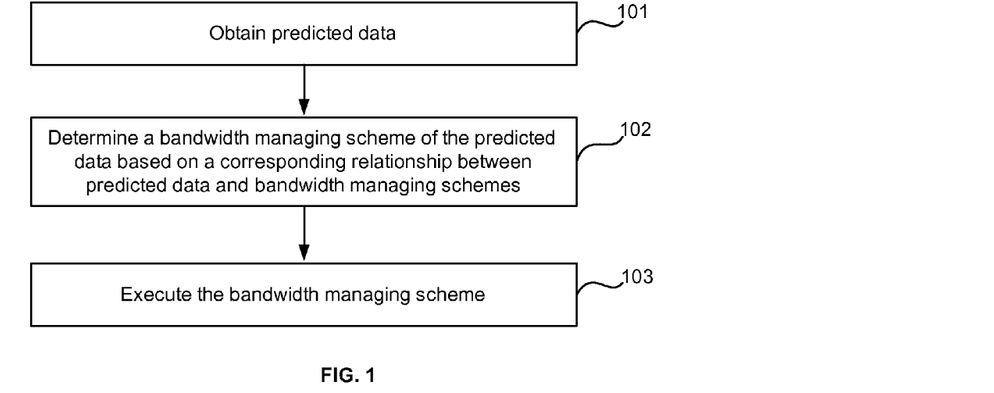
FIG. 1 depicts an exemplary method for generating a P2P network scheme in accordance with various disclosed embodiments.

FIG. 1 depicts an exemplary method for generating a P2P network scheme using a particular database in accordance with various disclosed embodiments. For example, by using the disclosed method, a P2P network scheme can be automatically (e.g., as opposed to personally or manually) generated to significantly reduce personal analysis, executions, etc.

Referring to Step 101 of FIG. 1, predicted data can be obtained. For example, the predicted data can be determined by averaging data in a characteristic interval of one or more designated types of data obtained from network data stored in a particular database.

The network data can be obtained from the particular database (e.g., of database 710 in FIG. 7) used to store data. The network data can include, but be not limited to, one or more of bandwidth information of a server (e.g., a HTTP server that provides resources for downloading), downloading speed provided by the server, average downloading speed of each node in the P2P network, average speed of providing downloads by each node in the P2P network, nodes on line, number of downloading users, number of newly added users, P2P bandwidth, and/or P2P rate.

Specifically, bandwidth of current server can be recorded in real time and each node in the P2P network can have a well-built reporting system. All recorded or reported data regarding the server and nodes in the P2P system can be stored in the particular database. All network data, e.g., including real-time data of the server and all-time statistical data of the P2P network, can be directly obtained from this particular database.

The designated types of data obtained from the network data can include, but be not limited to, one or more of newly increased or decreased number of users, downloading speed provided by the server, downloading speed provided by the P2P network, total downloading speed (e.g., contributed by the downloading speeds provided by the server and the P2P network), P2P rate, etc.

The network data often covers a wide range of types of data. To simplify the process, suitable data (e.g., designated types of data) can be selected from the network data to provide the predicted data. In addition, data averaged in a defined period of time can generally be more reliable and stable than instant data obtained at a time point. For example, when obtaining network data, instant data (e.g., a downloading speed provided by P2P network and/or the server, newly increased number of users, number of current users, etc.) at a time point may not accurately provide current status of the network. To the contrary, an averaged data can provide more accurate status of the network.

To provide more reliable data, a characteristic interval (e.g., a defined period of time, such as about 30 minutes or about one hour or any time length to the current time) can be defined and used to average the designated types of data in the characteristic interval to provide an averaged data. Such averaged data can be characteristic data of the designated types of data in this characteristic interval and can be defined as predicted data. The characteristic interval can be set as desired, depending on specific configurations. In one embodiment, the characteristic interval can be defined and written in configuration documents.

In one embodiment, the predicted data can include, e.g., a predicted bandwidth increasing rate or a predicted bandwidth decreasing rate. The predicted bandwidth increasing rate can be determined to equal to (the newly increased number of users in the characteristic interval X an average downloading speed in the characteristic interval X the characteristic interval)/a current bandwidth. The predicted bandwidth decreasing rate can be determined to equal to (the newly decreased number of users in the characteristic interval X an average downloading speed in the characteristic interval X the characteristic interval)/a current bandwidth.

Therefore, the predicted data can be obtained by, e.g., obtaining network data from a particular database used to store data, and using the network data to obtain an averaged data averaged from designated types of data in the characteristic interval. Such averaged data (i.e., the predicted data) can include, for example, an average downloading speed in the characteristic interval, a newly increased or decreased number of users in the characteristic interval, etc.

Figure 2:
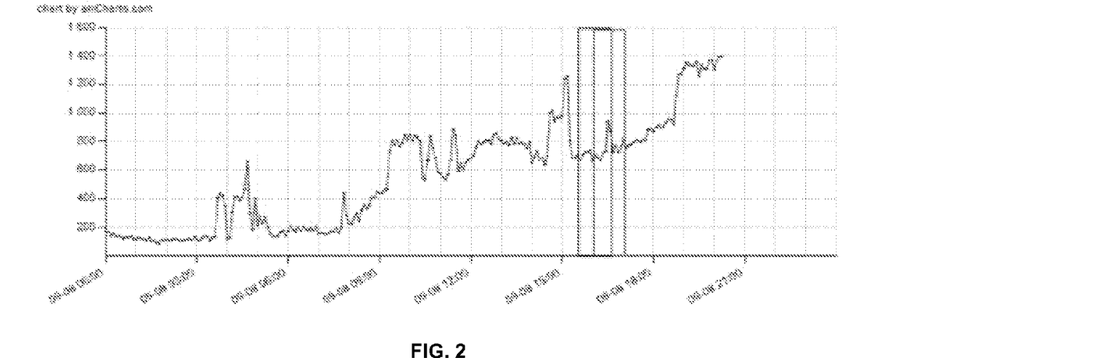
FIG. 2 depicts an exemplary method for analyzing and obtaining predicted data in accordance with various disclosed embodiments.

FIG. 2 is a schematic illustrating how a predicted bandwidth increasing rate or predicted bandwidth decreasing rate is analyzed and obtained. For example, once the designated types of data are obtained (e.g., from network data stored in a particular database), characteristic intervals can be considered slidable having a sliding interval for analysis and prediction. The sliding interval can be a period of time between starting time points of two characteristic intervals. The sliding interval can be selected as desired. By continuously sliding the characteristic intervals, accurate data prediction can be obtained. In other words, characteristic intervals separated by the sliding interval can be used to be more accurately predict data and data tendency, as compared with when the sliding interval is not used. The predicted bandwidth increasing rate or predicted bandwidth decreasing rate can then be obtained.

If a current characteristic interval has downloading activities in a degree higher than a previous characteristic interval, an increasing tendency is indicated. The downloading activities may include, e.g., number of newly added users, bandwidth consumption, etc. On the other hand, if the current characteristic interval has downloading activities in a degree lower than the previous characteristic interval, a decreasing tendency is indicated.

When an increasing tendency is indicated, the predicted bandwidth increasing rate can be determined to equal to [(a newly increased number of users in the characteristic interval X an average downloading speed in the characteristic interval X the characteristic interval)/a current bandwidth], where (1) (the newly increased number of users in the characteristic interval X the average downloading speed in the characteristic interval X the characteristic interval) is a prediction for a newly increased bandwidth; (2) the newly increased number of users in the characteristic interval equals to (the newly increased number of users in the current characteristic interval—the newly increased number of users in the previous characteristic interval); and (3) the current characteristic interval and the previous characteristic interval can have a same time length, for example, about 5 minutes, about 10 minutes, about 30 minutes, or any other time lengths.

When a decreasing tendency is indicated, the predicted bandwidth decreasing rate can be determined to equal to [(a newly decreased number of users in the characteristic interval X an average downloading speed in the characteristic interval X the characteristic interval)/a current bandwidth], where (1) (the newly decreased number of users in the characteristic interval X the average downloading speed in the characteristic interval X the characteristic interval) is a prediction for a newly decreased bandwidth; (2) the newly decreased number of users in the characteristic interval equals to (the newly increased number of users in the previous characteristic interval—the newly increased number of users in the current characteristic interval); and (3) the current characteristic interval and the previous characteristic interval can have a same time length, for example, about 5 minutes, about 10 minutes, about 30 minutes, or any other time lengths.

Referring to Step 102 of FIG. 1, a bandwidth managing scheme of the predicted data can be determined based on a corresponding relationship between predicted data and bandwidth managing schemes. For example, the bandwidth managing scheme of the predicted data can be determined by, e.g., determining a current scenario based on the predicted data and a corresponding relationship between predicted data and scenarios; determining a current scheme property (or a property of current scheme) based on the determined current scenario and a corresponding relationship between scenarios and scheme properties; and determining a current bandwidth managing scheme based on the determined current scheme property and a corresponding relationship between scheme properties and bandwidth managing schemes.

Further, when the current scenario is a scenario that needs to slow down (or to decrease the speed), the current scheme property can be determined as "should slow down" (or "should decrease the speed"), and the current bandwidth managing scheme can include, e.g., an action to slow down (or to decrease the speed) with an action value for the action to slow down (or to decrease the speed).

When the current scenario is a scenario that needs to speed up (or to increase the speed), the current scheme property can be determined as "should speed up" (or "should increase the speed"), and the current bandwidth managing scheme can include, e.g., an action to speed up (or to increase speed) with an action value for the action to speed up (or to increase the speed).

When the current scenario is a scenario that needs to push data, the current scheme property can be determined as "should push", and the current bandwidth managing scheme can include, e.g., an action to push with an action value for the action to push.

For example, in a combination including a predicted data A and a predicted data B, when the predicted data A falls among A1-A6 and the predicted data B falls among B1-B5, a corresponding scenario is a scenario that needs to slow down. Based on this corresponding relationship between predicted data and scenarios, when the predicted data A is A2 and the predicted data B is B3, a current scenario can be determined as a scenario that needs to slow down.

In another example, in a combination including a predicted data A and a predicted data C, when the predicted data A falls among A7-A10 and the predicted data C falls among C1-C5, a corresponding scenario is a scenario that needs to speed up. Based on this corresponding relationship between predicted data and scenarios, when the predicted data A is A10 and the predicted data C is C1, a current scenario can be determined as a scenario that needs to speed up.

In another example, with respect to the combination including the predicted data A and the predicted data B, when the predicted data A falls among A1-A3 and the predicted data B falls among B1-B3, a corresponding scenario can be a scenario 1 that needs to slow down. When the predicted data A falls among A4-A6 and the predicted data B falls among B4-B5, a corresponding scenario can be a scenario 2 that also needs to slow down.

Based on such corresponding relationship between predicted data and scenarios, when the predicted data A is A2 and the predicted data B is B3, a current scenario can be determined as scenario 1 that needs to slow down. Accordingly, a corresponding action value (for the action to slow down) can be a value X. A corresponding bandwidth managing scheme can thus include an action to slow down and an action value (for the action to slow down) of X. Likewise, when a current scenario is determined as scenario 2 that needs to slow down, a corresponding bandwidth managing scheme may include an action and an action value (for the action to slow down) of, e.g., a value Y.

Figure 3:
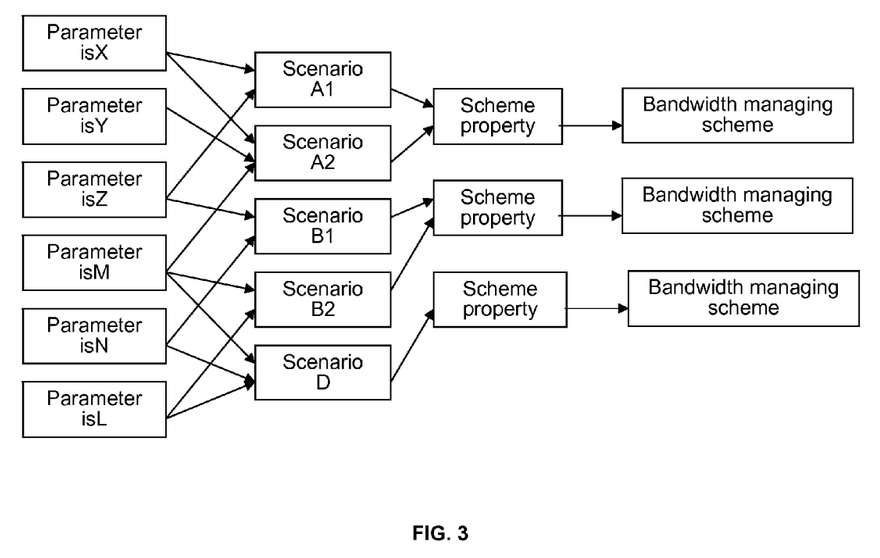
FIG. 3 depicts corresponding relationships across parameters, scenarios, scheme properties, and bandwidth managing schemes in accordance with various disclosed embodiments.

FIG. 3 depicts corresponding relationships across parameters, scenarios, scheme properties, and bandwidth managing schemes (e.g., including scheme actions). The parameters can include, e.g., predicted data. As shown in FIG. 3, a combination of one or more parameters (e.g., predicted data) can correspond to a scenario.

In one embodiment, assuming scenarios A1 and A2 are scenarios that need to slow down (i.e., to decrease the speed), then a scheme property corresponding to scenarios A1 and A2 can be determined as "should slow down", and a corresponding bandwidth managing scheme can include an action to slow down and an action value for the action to slow down. It should be noted that the scenarios A1 and A2 having a same scheme property of the action may have different action values.

In one embodiment, assuming scenarios B1 and B2 are scenarios that need to speed up (i.e., to increase the speed), then a scheme property corresponding to scenarios B1 and B2 can be determined as "should speed up", and a corresponding bandwidth managing scheme can include an action to speed up and an action value for the action to speed up. It should be noted that the scenarios B1 and B2 having a same scheme property of the action may have different action values.

In one embodiment, scenario D is a scenario that needs to push data, then a scheme property corresponding to scenario D can be determined as "should push", and a corresponding bandwidth managing scheme can include an action to push and an action value for the action to push (e.g., to a number of nodes in the P2P network).

The predicted data can be analyzed and simplified into various parameters. Referring back to FIG. 3, these parameters can be denoted as isXXX including, such as, for example, isHotMoment, isBandWidthNotEnough, isOverflowed, isSpeedLow, etc. Combinations of these parameters (isXXX) can provide a corresponding scenario. Each scenario can correspond to a scheme property (e.g., denoted as "should do something" or shouldxxx) and a bandwidth managing scheme (e.g., denoted as Action). That is, a combination of various parameters (e.g., isXXX, isYYY, etc.) can determine a scheme property (e.g., shouldxxx), which can determine a scheme action (e.g., having a logic path of isXXX and isYYY . . . =>should do something=>action). A bandwidth managing scheme in a P2P network can then be generated. The disclosed method for generating such scheme can therefore be easily expanded, understood, with reasonable logic, and suitable for other types of data analysis to determine action schemes/strategies.

In a further example, a generated scheme can include (1) an Action=speedup and an ActionValue (or action value) =200 k (i.e., to speed up to 200 k or to speed up by 200 k, which may be adjusted in practical applications); (2) an Action=slowdown and an ActionValue=80 k (i.e., to slow down to 80 k or to slow down by 80 k, which may be adjusted in practical applications); and (3) an Action=push and an ActionValue=30,000 (i.e., to push data to about 30,000 nodes in the P2P network).

The generated schemes can depend from determination of a corresponding scheme property, e.g., denoted as "shouldxxx" (or should do something), including, should-slowdown (or should slow down), shouldspeedup (or should speed up), shouldpush (or should push), etc. If a scheme property is determined as shouldslowdown, the bandwidth managing scheme can have an Action=slowdown and an ActionValue=80 K as in the example described above. If a scheme property is determined as shouldspeedup, the bandwidth managing scheme can have an Action=speedup and an ActionValue=200 k as in the example described above. If a scheme property is determined as shouldpush, the bandwidth managing scheme can have an Action=push and an ActionValue=30,000.

Such scheme properties can depend on status of all parameters. The combination of these parameters can form different scenarios and then determine corresponding scheme properties. For example, when three different combinations of parameters include isOverFlowed; isExtremelyUp and isOverFlowing; as well as isNormalUp and isOverFlowing, and each combination forms a scenario that needs to slow down, the scheme property can be determined as shouldslowdown. Depending on the combinations of the parameters (e.g., predicted data), action values for the action to slow down can be different.

In another example, when three different combinations of parameters include isBandWidthWasted and isColdMoment; isBandWidthWasted and isHotMoment; as well as isBandWidthWasted and IsNormalMoment, and each combination forms a scenario that needs to speed up, the scheme property can be determined as shouldspeedup. Depending on the combinations of the parameters (e.g., predicted data), action values for the action to speed up can be different.

In another example, when three different combinations of parameters include isBandwidthNotEnough; isBandWidthNotEnough and isSpeedExtremelyLow; as well as isBandWidthNotEnough and isSpeedLow, and each combination forms a scenario that needs to push data, the scheme property can be determined as shouldpush. Depending on the combinations of the parameters (e.g., predicted data), action values for the action to push can be different.

When determining a bandwidth managing scheme, as discussed above, the predicted data can be a predicted bandwidth increasing rate or a predicted bandwidth decreasing rate. When the predicted bandwidth decreasing rate is greater than a first predetermined value (e.g., about 2% or other value, depending on specific applications), a current scenario can be a scenario that needs to speed up, a scheme property can be determined as shouldspeedup, and a current bandwidth managing scheme can include an action to speed up with an action value.

When the predicted bandwidth increasing rate is greater than a second predetermined value (e.g., about 3% or other value, depending on specific applications) but less than a third predetermined value (e.g., about 15% or other value, depending on specific applications), a current scenario can be a scenario that needs to slow down, a scheme property can be determined as shouldslowdown, and a current bandwidth managing scheme can include an action to slowdown with an action value.

When the predicted bandwidth increasing rate is greater than the third predetermined value, a current scenario can be a scenario that needs to push data. A scheme property can be determined as shouldpush, and a current bandwidth managing scheme can include an action to push with an action value.

Referring to Step 103 of FIG. 1, the bandwidth managing scheme of the predicted data can be executed.

In an embodiment when the bandwidth managing scheme includes an action to slow down with an action value of the action to slow down, the server can be controlled to reduce a speed for providing resources to download by (or to) the action value. When the bandwidth managing scheme includes an action to speed up with an action value for the action to speed up, the server can be controlled to increase a speed for providing resources to download by (or to) the action value. When the bandwidth managing scheme includes an action to push with an action value for the action to push, the server can be controlled to push data (e.g., resources) to the P2P network according to the action value.

For example, when an Action=speedup and an ActionValue=200 k, the server can increase the speed for providing resources to download by (or to) about 200 K. When an Action=slowdown and an ActionValue=80 K, the server can decrease the speed for providing resources to download by (or to) about 80 K. When an Action=push and an ActionValue=30,000, the server can push resources to about 30,000 nodes in the P2P network.

In this manner, the server bandwidth can be automatically monitored and maintained in an appropriate level, such that the server can be stably controlled and operated within the bandwidth load and the P2P network can achieve backup resources. By automatically (as opposed to personally or manually) predicting increasing/decreasing tendency of bandwidth and popularity tendency of downloading activities, protections can be taken as needed. Before the resources are released, the disclosed method can be used to analyze and/or push data into the P2P network. If an action to slow down has been executed according to the disclosed bandwidth managing scheme and the downloading speed still needs to be improved, a scheme for pushing data with an action value for the pushing can be automatically generated.

Figure 4:
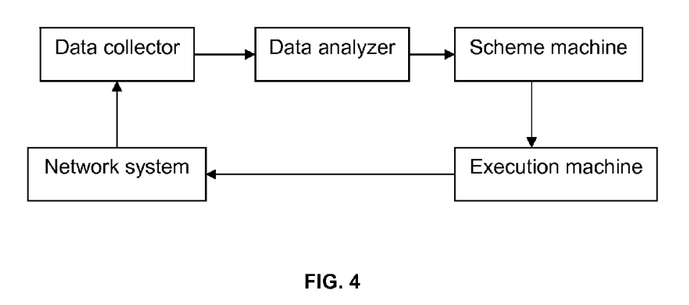
FIG. 4 depicts an exemplary network system in accordance with various disclosed embodiments.

In various embodiments, a system for generating a P2P network scheme is provided. For example, FIG. 4 depicts an exemplary system including a data collector, a data analyzer, a scheme machine, an execution machine, a network system, etc. In one embodiment, each of the data collector, the data analyzer, the scheme machine, and/or the execution machine can be a function module, which can be divided into various parts (e.g., sub-modules) or can be configured individually or combined. The function modules can be configured in a same machine/system or a different machine/system. The function modules can be configured in one or more machines/systems within the network. For example, the data collector and the data analyzer can be combined into a data provider having functions of a data collector and a data analyzer. In another example, the scheme machine and the execution machine can also be combined into one machine.

The data collector can be used to collect all network information including, e.g., upload and download information of each resource, bandwidth information, number of online downloading users, newly increased or decreased number of users, etc. For example, the data collector can be used to collect network data from a particular network database used to store data. As disclosed, the network data can include, but be not limited to, one or more of bandwidth information of the server (e.g., a HTTP server that provides resources for downloading), downloading speed provided by the server, average speed of providing downloads by each node in the P2P network, average downloading speed of each node, nodes on line, number of users, number of newly added users, P2P bandwidth, P2P rate, etc.

The data analyzer can be used to retrieve suitable data from the network data to provide predicted data including, for example, rate of newly increased (or decreased) number of users, increasing or decreasing tendency of bandwidth, increasing tendency of user numbers, predicted value of the increased or decreased bandwidth, etc. In one embodiment, because the collected network data are unsorted and cannot be directly sent to the scheme machine for analysis and determination. Then, the data analyzer can obtain one or more designated types of data from the network data. The designated types of data can include one or more of newly increased (or decreased) number of downloading users, downloading speed provided by the server, downloading speed provided by the P2P network, total downloading speed (e.g., contributed by the downloading speeds provided by the server and the P2P network), P2P rate, etc. Thereafter, the data analyzer can determine the predicted data or network parameters (e.g., as shown in FIG. 3) by averaging data of the designated types of data in a characteristic interval.

The scheme machine can be used to determine a bandwidth managing scheme of the predicted data based on a corresponding relationship between predicted data and bandwidth managing schemes.

For example, the scheme machine can determine a current scenario based on the predicted data and a corresponding relationship between predicted data and scenarios. The scheme machine can also determine a current scheme property based on the determined current scenario and a corresponding relationship between scenarios and scheme properties. The scheme machine can further determine a current bandwidth managing scheme based on the determined current scheme property and a corresponding relationship between scheme properties and bandwidth managing schemes.

Further, when the current scenario is a scenario that needs to slow down (or to decrease the speed), the current scheme property can be determined as "should slow down" (or "should decrease the speed"), and the current bandwidth managing scheme can include an action to slow down (or to decrease the speed) with an action value for the action to slow down (or to decrease the speed).

When the current scenario is a scenario that needs to speed up (or to increase the speed), the current scheme property can be determined as "should speed up" (or "should increase the speed"), and the current bandwidth managing scheme can include an action to speed up (or to increase the speed) with an action value for the action to speed up (or to increase the speed).

When the current scenario is a scenario that needs to push data, the current scheme property can be determined as "should push", and the current bandwidth managing scheme can include an action to push with an action value for the action to push.

The execution machine can be used to execute the bandwidth managing scheme, e.g., provided by the scheme machine, on the network system.

For example, when the bandwidth managing scheme includes an action to slow down and an action value for the action to slow down, the execution machine can control the server (e.g., located within the network system) to reduce the speed for providing resources to download according to the action value. When the bandwidth managing scheme includes an action to speed up and an action value for the action to speed up, the execution machine can control the server to increase the speed for providing resources to download according to the action value. When the bandwidth managing scheme includes an action to push data (resources) and an action value for the action to push data (resources), the execution machine can control the server to push resources into the P2P network according to the action value.

The network system in FIG. 4 can include, e.g., P2P network and a server, e.g., for providing HTTP download resources. After execution of a certain bandwidth managing scheme, related data/information can be fed back to the data collector for constant adjustment.

Figure 5:
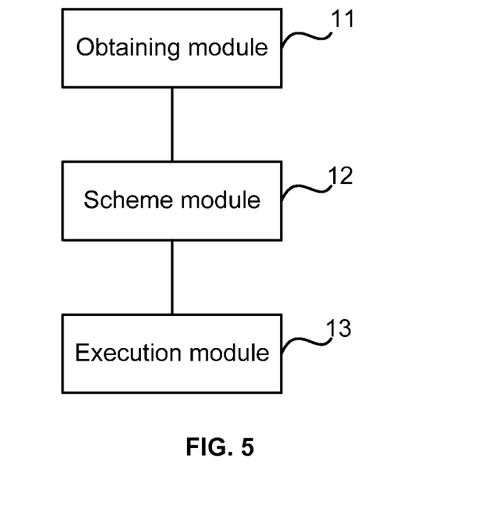
FIG. 5 depicts an exemplary apparatus for generating a scheme of P2P network in accordance with various disclosed embodiments.

FIG. 5 depicts an exemplary apparatus for generating a scheme of P2P network. As shown in FIG. 5, the exemplary apparatus can include an obtaining module 11 for obtaining predicted data; a scheme module 12 for determining a bandwidth managing scheme of the predicted data based on a corresponding relationship between predicted data and bandwidth managing schemes; and an execution module 13 for executing the bandwidth managing scheme.

The obtaining module 11 can be used to obtain network data from a particular database used to store data and determine predicted data by averaging data in a characteristic interval of one or more designated types of data selected from network data.

In one embodiment, the predicted data can include, e.g., a predicted bandwidth increasing rate or a predicted bandwidth decreasing rate. The obtaining module 11 can be used to determine the predicted bandwidth increasing rate=(a newly increased number of users in the characteristic interval X an average downloading speed in the characteristic interval X the characteristic interval)/a current bandwidth. The obtaining module 11 can be used to determine the predicted bandwidth decreasing rate=(a newly decreased number of users in the characteristic interval X an average downloading speed in the characteristic interval X the characteristic interval)/a current bandwidth.

The obtaining module 11 can be used to obtain network data from a particular database used to store data. The network data can include, but be not limited to, one or more of bandwidth information of a server, average downloading speed of each node in the P2P network, average speed of providing resources of each node, nodes on line, number of downloading users, P2P bandwidth, P2P rate, etc.

The obtaining module 11 can use the network data to obtain an averaged data that is averaged from designated types of data in a characteristic interval. Such averaged data can include, for example, an average downloading speed in the characteristic interval, a newly increased or decreased number of users in the characteristic interval, etc.

The scheme module 12 can be used to determine a current scenario based on the predicted data and a corresponding relationship between predicted data and scenarios. The scheme module 12 can also be used to determine a current scheme property based on the determined current scenario and a corresponding relationship between scenarios and scheme properties. The scheme module 12 can further be used to determine a current bandwidth managing scheme based on the determined current scheme property and a corresponding relationship between scheme properties and bandwidth managing schemes.

When the current scenario is a scenario that needs to slow down (or to decrease the speed), the scheme module 12 can be used to determine a current scheme property as "should slow down" (or "should decrease the speed") and to determine a current bandwidth managing scheme including an action to slow down (or to decrease the speed) with an action value for the action to slow down (or to decrease the speed).

When the current scenario is a scenario that needs to speed up (or to increase the speed), the scheme module 12 can be used to determine the current scheme property as "should speed up" (or "should increase the speed") and to determine the current bandwidth managing scheme including an action to speed up (or to increase the speed) with an action value for the action to speed up (or to increase the speed).

When the current scenario is a scenario that needs to push data, the scheme module 12 can be used to determine the current scheme property as "should push" and to determine the current bandwidth managing scheme including an action to push with an action value for the action to push.

The predicted data can be a predicted bandwidth increasing rate or a predicted bandwidth decreasing rate. When the predicted bandwidth decreasing rate is greater than a first predetermined value, the scheme module 12 can be used to determine a current scenario that needs to speed up, a scheme property as "should speed up", and a current bandwidth managing scheme including an action to speed up with an action value for the action to speed up.

When the predicted bandwidth increasing rate is greater than a second predetermined value but less than a third predetermined value, the scheme module 12 can be used to determine a current scenario that needs to slow down, a scheme property as "should slow down", and a current bandwidth managing scheme including an action to slow down with an action value for the action to slow down.

When the predicted bandwidth increasing rate is greater than the third predetermined value, the scheme module 12 can be used to determine a current scenario that needs to push data, a scheme property as "should push", and a current bandwidth managing scheme including an action to push with an action value for the action to push.

The execution module 13 can be used, when the bandwidth managing scheme includes an action to slow down and an action value for the action to slow down, to control the server to reduce the speed for providing resources to download by the action value. When the bandwidth managing scheme includes an action to speed up and an action value for the action to speed up, the execution module 13 can be used to control the server to increase the speed for providing resources to download by the action value. When the bandwidth managing scheme includes an action to push data (e.g., resources) and an action value for the action to push, the execution module 13 can be used to control the server to push resources in the P2P network by the action value.

In various embodiments, the disclosed modules can be configured in one apparatus or configured in multiple apparatus as desired. The modules disclosed herein can be integrated in one module or in multiple modules. Each of the modules disclosed herein can be divided into one or more sub-modules, which can be recombined in any manner.

The disclosed embodiments (e.g., as shown in FIGS. 1-7) can be examples only. One of ordinary skill in the art would appreciate that suitable software and/or hardware (e.g., a universal hardware platform) may be included and used to predict, manage, and execute the disclosed schemes. For example, the disclosed embodiments can be implemented by hardware only, which alternatively can be implemented by software products only. The software products can be stored in a storage medium. The software products can include suitable commands to enable a terminal device (e.g., including a mobile phone, a personal computer, a server, or a network device, etc.) to implement the disclosed embodiments.

Other applications, advantages, alternations, modifications, or equivalents to the disclosed embodiments are obvious to those skilled in the art.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

During a conventional P2P pushing process, decisions regarding if a pushing action is needed, when to push resources, and/or how to push resources into the P2P network are made by personal analysis. Schemes for pushing resources are also personally decided and executed, which relies on person's skills and experiences. It is therefore desirable to provide methods, apparatus, and systems for automatically (as opposed to personally or manually) generating P2P network schemes. By using the disclosed methods, apparatus, and systems, data can be automatically analyzed to provide predicted data. A bandwidth managing scheme can be automatically generated via the predicted data. The generated bandwidth managing scheme can then be used to automatically determine schemes for pushing resources. Processes involving personal analysis and executions can be reduced or avoided.

What is claimed is:

1. A method for generating a peer-to-peer (P2P) network scheme comprising:
   obtaining predicted data, including:
      obtaining network data from a particular database used to store data, wherein the network data includes downloading activities of a resource on a HTTP server that provides the resource for downloading, and downloading activities of the resource in a P2P network; and
      determining the predicted data by averaging data in a characteristic interval of a designated type of data from the network data;
   determining a bandwidth managing scheme of the predicted data based on a corresponding relationship between predicted data and bandwidth managing schemes, wherein the bandwidth managing schemes are configured for adjusting a downloading bandwidth of the HTTP server allocated for the resource and adjusting a number of nodes in the P2P network being pushed with the resource according to the predicted data; and
   executing the determined bandwidth managing scheme on the HTTP server and the P2P network;
   wherein the predicted data includes a predicted bandwidth increasing rate or a predicted bandwidth decreasing rate and wherein obtaining the predicted data includes:
   determining the predicted bandwidth increasing rate=(a newly increased number of users in a characteristic interval×an average downloading speed in the characteristic interval×the characteristic interval)/a current bandwidth; or
   determining the predicted bandwidth decreasing rate=(a newly decreased number of users in the characteristic interval×the average downloading speed in the characteristic interval×the characteristic interval)/the current bandwidth;
   wherein the users are terminals downloading the resource from at least one of the HTTP server and the P2P network recorded in the network data.

2. The method of claim 1, wherein:
   the network data includes one or more of bandwidth information of the HTTP server, an average downloading speed of each node in the P2P network, an average speed of providing downloads by each node in the P2P network, nodes on line, number of downloading users, P2P bandwidth, and P2P rate; and
   the averaged data includes one or more of the average downloading speed in the characteristic interval, the newly increased number of users in the characteristic interval, and the newly decreased number of users in the characteristic interval.

3. The method of claim 1, wherein determining the bandwidth managing scheme of the predicted data based on the corresponding relationship between the predicted data and the bandwidth managing schemes includes:
   determining a current scenario based on the predicted data and a corresponding relationship between predicted data and scenarios;
   determining a current scheme property based on the determined current scenario and a corresponding relationship between scenarios and scheme properties; and
   determining a current bandwidth managing scheme based on the determined current scheme property and a corresponding relationship between scheme properties and bandwidth managing schemes.

4. The method of claim 3, wherein:
   when the current scenario is a scenario that needs to slow down, the current scheme property is determined as "should slow down" and the current bandwidth managing scheme includes an action to slow down with an action value for the action to slow down; or
   when the current scenario is a scenario that needs to speed up, the current scheme property is determined as "should speed up" and the current bandwidth managing scheme includes an action to speed up with an action value for the action to speed up; or
   when the current scenario is a scenario that needs to push data, the current scheme property is determined as "should push" and the current bandwidth managing scheme includes an action to push with an action value for the action to push.

5. The method of claim 3, wherein the predicted data includes a predicted bandwidth increasing rate or a predicted bandwidth decreasing rate and wherein:
   when the predicted bandwidth decreasing rate is greater than a first predetermined value, the current scenario is a scenario that needs to speed up; the current scheme property is determined as "should speed up"; and the current bandwidth managing scheme includes an action to speed up with an action value for the action to speed up; or
   when the predicted bandwidth increasing rate is greater than a second predetermined value but less than a third predetermined value, the current scenario is a scenario that needs to slow down; the current scheme property is determined as "should slow down"; and the current bandwidth managing scheme includes an action to slow down with an action value for the action to slow down; or
   when the predicted bandwidth increasing rate is greater than the third predetermined value, the current scenario is a scenario that needs to push data; the current scheme property is determined as "should push", and the current bandwidth managing scheme includes an action to push with an action value for the action to push.

6. The method of claim 1, wherein executing the bandwidth managing scheme includes:
when the bandwidth managing scheme includes an action to slow down and an action value for the action to slow down, controlling the HTTP server to reduce a speed for providing the resource to download according to the action value; or
when the bandwidth managing scheme includes an action to speed up and an action value for the action to speed up, controlling the HTTP server to increase the speed for providing resources to download according to the action value; or
when the bandwidth managing scheme includes an action to push and an action value for the action to push, controlling the HTTP server to push resources into the P2P network according to the action value, wherein the action value for the action to push includes the number of nodes in the P2P network being pushed with the resource.

7. An apparatus for generating a peer-to-peer (P2P) network scheme comprising at least a processor and a plurality of program modules to be executed by the processor, the plurality of program modules comprising:
an obtaining module configured to obtain predicted data, including:
obtaining network data from a particular database used to store data, wherein the network data includes downloading activities of a resource on a HTTP server that provides the resource for downloading, and downloading activities of the resource in a P2P network; and
determining the predicted data by averaging data in a characteristic interval of a designated type of data from the network data;
a scheme module configured to determine a bandwidth managing scheme of the predicted data based on a corresponding relationship between predicted data and bandwidth managing schemes, wherein the bandwidth managing schemes are configured for adjusting a downloading bandwidth of the HTTP server allocated for the resource and adjusting a number of nodes in the P2P network being pushed with the resource according to the predicted data; and
an execution module configured to execute the determined bandwidth managing scheme on the HTTP server and the P2P network;
wherein the predicted data includes a predicted bandwidth increasing rate or a predicted bandwidth decreasing rate and wherein the obtaining module is configured to:
determine the predicted bandwidth increasing rate=(a newly increased number of users in a characteristic interval×an average downloading speed in the characteristic interval×the characteristic interval)/a current bandwidth; or
determine the predicted bandwidth decreasing rate=(a newly decreased number of users in the characteristic interval×the average downloading speed in the characteristic interval×the characteristic interval)/the current bandwidth.

8. The apparatus of claim 7, wherein:
the network data includes one or more of bandwidth information of the HTTP server, an average downloading speed of each node in the P2P network, an average speed of providing downloads by each node in the P2P network, nodes on line, number of downloading users, P2P bandwidth, and P2P rate; and
the averaged data includes one or more of the average downloading speed in the characteristic interval, the newly increased number of users in the characteristic interval, and the newly decreased number of users in the characteristic interval.

9. The apparatus of claim 7, wherein the scheme module is configured to:
determine a current scenario based on the predicted data and a corresponding relationship between predicted data and scenarios;
determine a current scheme property based on the determined current scenario and a corresponding relationship between scenarios and scheme properties; and
determine a current bandwidth managing scheme based on the determined current scheme property and a corresponding relationship between scheme properties and bandwidth managing schemes.

10. The apparatus of claim 9, wherein the scheme module is configured:
when the current scenario is a scenario that needs to slow down, to determine the current scheme property as "should slow down" and to determine the current bandwidth managing scheme including an action to slow down with an action value for the action to slow down; or
when the current scenario is a scenario that needs to speed up, to determine the current scheme property as "should speed up" and to determine the current bandwidth managing scheme including an action to speed up with an action value for the action to speed up; or
when the current scenario is a scenario that needs to push data, to determine the current scheme property as "should push" and to determine the current bandwidth managing scheme including an action to push with an action value for the action to push.

11. The method of claim 1, wherein:
the predicted data includes a predicted bandwidth changing rate; and
the predicted bandwidth changing rate is positively correlated to a newly changed number of users in the characteristic interval and an average downloading speed in the characteristic interval, and is negatively correlated to a current bandwidth.

12. The method of claim 11, wherein:
the average downloading speed in the characteristic interval is a summation of: an average downloading speed in the characteristic interval contributed by the HTTP server, and an average downloading speed in the characteristic interval contributed by the P2P network.

13. The method of claim 11, wherein:
the newly changed number of users in the characteristic interval is obtained by comparing number of users downloading the resource in the characteristic interval and number of users downloading the resource in a previous characteristic interval.

14. The method of claim 13, further comprising:
determining a sliding interval; and
obtaining a start time point the previous characteristic interval based on the sliding interval and the starting point of the characteristic interval.

* * * * *